United States Patent
Kuster et al.

[11] 3,903,559
[45] Sept. 9, 1975

[54] DEVICE FOR CLEANING VEHICLE WHEELS

[75] Inventors: Walter Kuster; Marcel Chamot, both of Geneva, Switzerland

[73] Assignee: TVI-Television Industrielle S.A., Switzerland

[22] Filed: July 8, 1974

[21] Appl. No.: 486,325

[30] Foreign Application Priority Data
July 10, 1973 Switzerland.................... 10004/73

[52] U.S. Cl................. 15/21 R; 134/45; 15/DIG. 2
[51] Int. Cl. ............................................ B60s 3/00
[58] Field of Search............ 15/21 R, 21 D, DIG. 2; 134/45

[56] References Cited
UNITED STATES PATENTS

| | | | |
|---|---|---|---|
| 2,797,006 | 6/1957 | Thompson | 15/DIG. 2 |
| 2,800,671 | 7/1957 | Nowak | 15/DIG. 2 |
| 3,809,919 | 5/1974 | Aaron | 15/DIG. 2 |

FOREIGN PATENTS OR APPLICATIONS

| | | | |
|---|---|---|---|
| 1,270,251 | 4/1972 | United Kingdom | 15/DIG. 2 |

*Primary Examiner*—Richard E. Aegerter
*Assistant Examiner*—L. Footland
*Attorney, Agent, or Firm*—Robert E. Burns; Emmanuel J. Lobato; Bruce L. Adams

[57] ABSTRACT

A device for cleaning the wheels of lorries leaving a worksite comprises a frame having rollers movable heightwise relative to the frame so that either the frame or the rollers can support a pair of wheels. An electronic circuit provides for automatic raising of the rollers in response to correct contact of the wheels, starting drive of the rollers when they reach the raised position, starting auxiliary cleaning means, and stopping drive of the rollers and the cleaning means after a preset time or a preset number of revolutions at a speed sufficient to remove mud and dirt by centrifugal action, and then lowering the rollers. A detector of the speed of the rollers provides a warning if for example the rollers are blocked by braking of the vehicle wheels.

17 Claims, 7 Drawing Figures

DEVICE FOR CLEANING VEHICLE WHEELS

The invention concerns devices for cleaning the wheels of vehicles, for example lorries upon leaving a worksite, of the type comprising a frame, a platform, two pairs of rollers which may be rotated by at least one motor, preferably a hydraulic motor, and disposed in a manner to turn a set of coaxial wheels of a vehicle to be cleaned, one of the two parts namely the platform or roller bearing being movable heightwise by the intermediary of hydraulic cylinders between a first position in which the wheels are supported by the platform and a second position in which the wheels are supported by the rollers, and auxiliary cleaning means including nozzles for delivering water and/or air, and/or rotary brushes.

As a safety measure for road users, it is desireable to clean the wheels of vehicles leaving worksites before the vehicles circulate on the public highway, so as to avoid fouling the roads. This has even been made compulsory in certain countries. There are already known devices specially adapted for this purpose, which can be moved on the worksite, and on which it is possible to mount the front or rear wheels of a vehicle for the purpose of cleaning these wheels. To obtain an efficient cleaning, these devices must operate at high speed which involves a danger for the persons who must supervise the cleaning operation. In the known devices, protective screens are provided to ensure this protection.

The present invention proposes to provide an improved device in which the cleaning operation is automated to a large degree so that the cleaning is carried out rapidly and in entire safety. To this end, the device according to the invention is characterized by the fact that it comprises:

a. at least one contact provided on the platform for actuation by the vehicle in its correct position, and connected in a first circuit controlling a first control member which triggers movement of the said mobile part towards its second position;

b. at least one end-of-path contact actuated by said mobile part in its second position and connected in a second circuit controlling a second control member for starting up the rollers;

c. a counter of the rotational speed of the rollers adapted to emit signals; and d. an electronic circuit controlled by said second circuit and by the signals of said counter and including a third circuit actuating an alarm with a delay defined by a delay element if after actuation of said second control member the rollers do not reach a given rotational speed; a fourth circuit controlling a third control member for starting up said cleaning means; a fifth circuit for providing after a given period a stop signal which stops the rollers and said cleaning means; and a sixth circuit controlling a fourth control member to actuate the movement of said mobile part towards its first position.

In this device the most important sequences of the cleaning operation can take place without manual intervention and the wheels to be cleaned are adequately rotated during a given period which may preferentially be given by said counter which stops only after the rollers have carried out a given number of revolutions and during which the wheels have been driven at a speed to ensure an efficient centrifugal effect.

Other characteristics are given in the statement of claim.

An embodiment of the invention will now be described, by way of example, with reference to the accompanying schematic drawings, in which.

Figure 1:
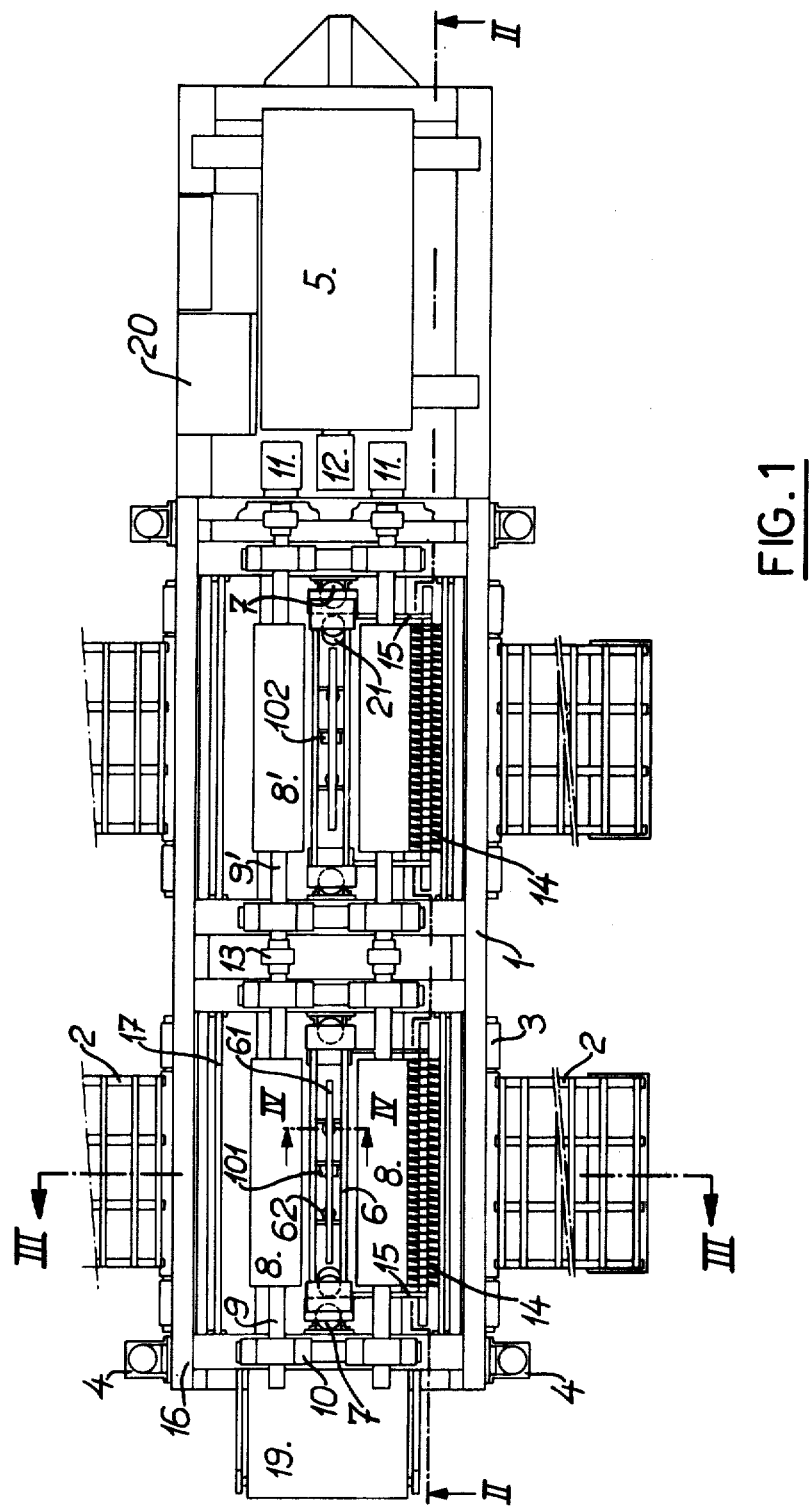
FIG. 1 is an overall plan view of a cleaning device.
Figure 2:
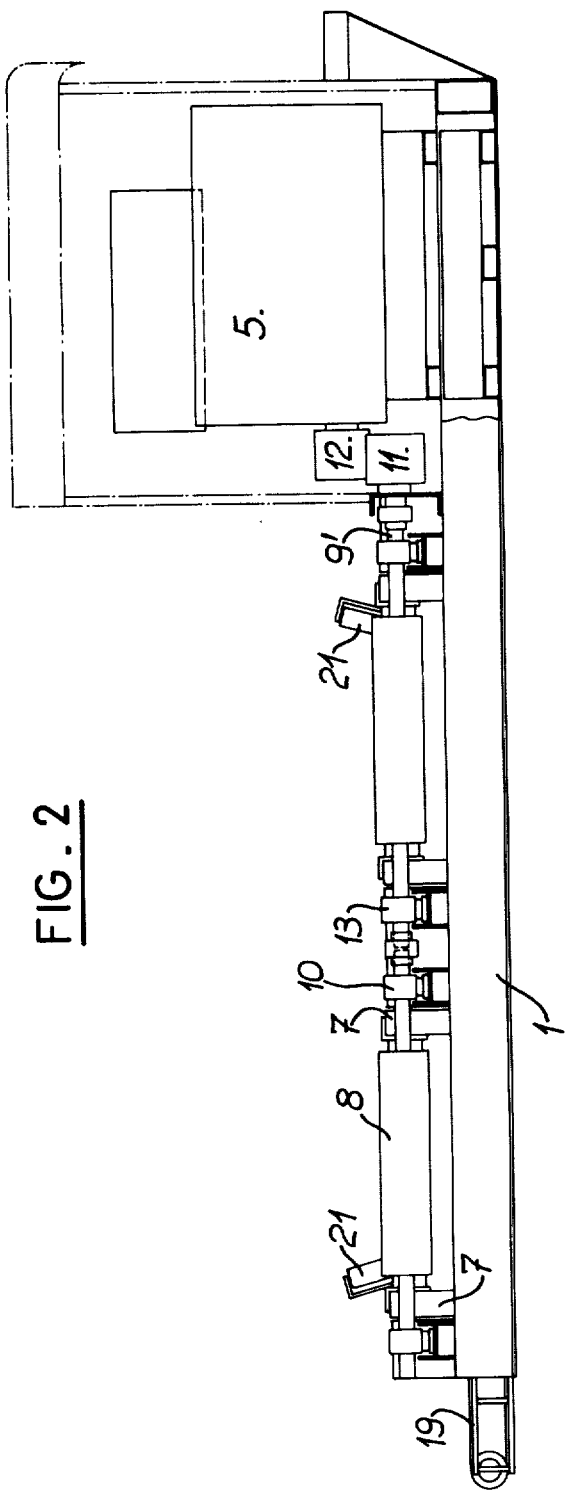
FIG. 2 is a cross-section taken along line II—II of FIG. 1.
Figure 3:
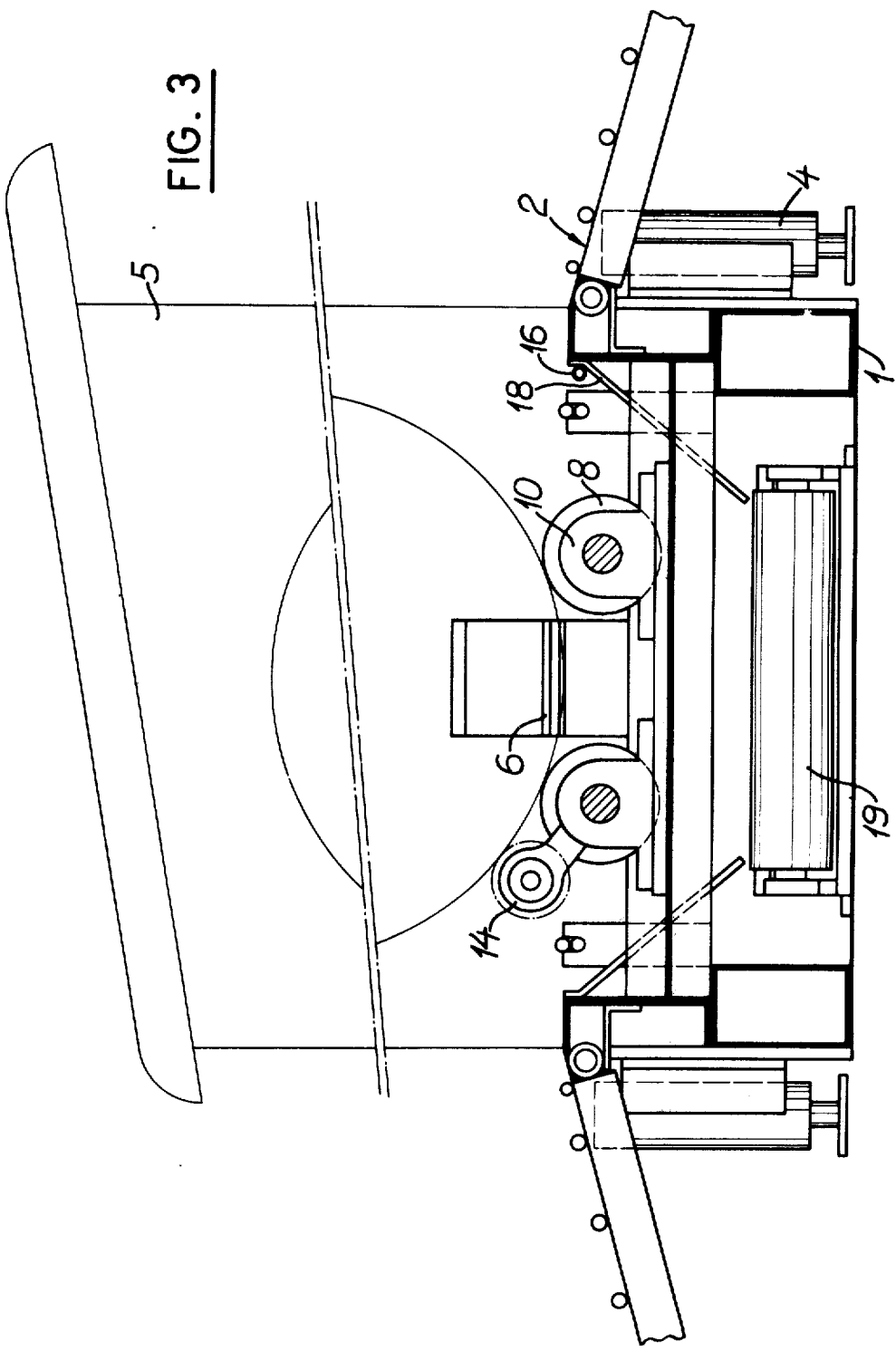
FIG. 3 is a cross-section taken along line III—III of FIG. 1.

Reference is made to FIGS. 1 to 3.

This device comprises a chassis 1 which may be moved in the form of a trailer by means of two removable wheels (not shown). A vehicle to be cleaned can pass over this chassis which includes for this purpose two pairs of ramps 2 forming an access track, these ramps being connected by hinges 3 to the chassis 1 and being liftable manually onto the chassis during transport of the unit.

In use, chassis 1 may be secured to the ground by means of four hydraulic jacks 4 which provide the assembly with the required stability for passage of a vehicle over the chassis. Jacks 4 are actuated by known means controlled from inside a cabin 5 which houses all of the other control systems of the device.

Between each pair of ramps 2 is provided in the central part of the chassis a grid 6, disposed transversal to the tracks, mounted on two electronically controlled hydraulic pistons 7 fixed to chassis 1. Two steel rollers 8 or 8' are mounted on either side of each grid 6 for rotatably driving the wheels of a vehicle. These rollers, 8, 8' are fixed on shafts 9, 9' supported by bearings 10 fixed to the chassis. Shafts 9' are rotatably driven by means of two hydraulic motors 11 which are coupled by known means to a pump 12 provided with means ensuring a perfect balancing of the two motors and which is itself actuated by a motor, for example a diesel engine mounted in the control cabine 5. The shafts 9, 9' situated on the same side of the grids are aligned and connected together by coupling means 13 of any type.

Each grid 6 is connected to a brush 14 by the intermediary of two levers 15 pivotable about a fixed point and articulated respectively to the end of the grid 6 and the end of brush 14, so that the brushes 14 move up when the grids are lowered, and vice versa. A rotational drive of the brushes is provided, for example by means of a mechanical coupling between the shaft 9 rollers 8 and the shaft of the brush.

On the side of chassis 1 opposite to brushes 14 are provided pierced tubes 16 for delivering water under pressure and air. To reduce the spacing between the edge of chassis 1 and the rollers 8, 8' it is possible to provide bars 17 fixed at their ends in chassis 1.

A conveyor belt 19 mounted inside the chassis 1 and protruding form one end evacuates the dirt and mud which are directed onto to the belt by inclined screens 18. This conveyor belt 19 is for example driven by means of a transmission belt connected to the shaft 9 of one of the rollers 8, or by any other appropriate means. Lateral guiding of the vehicle on the chassis 1 is ensured by oblique rollers 21 fixed on the chassis 1 at the outer ends of rollers 8, 8'.

Figure 4:
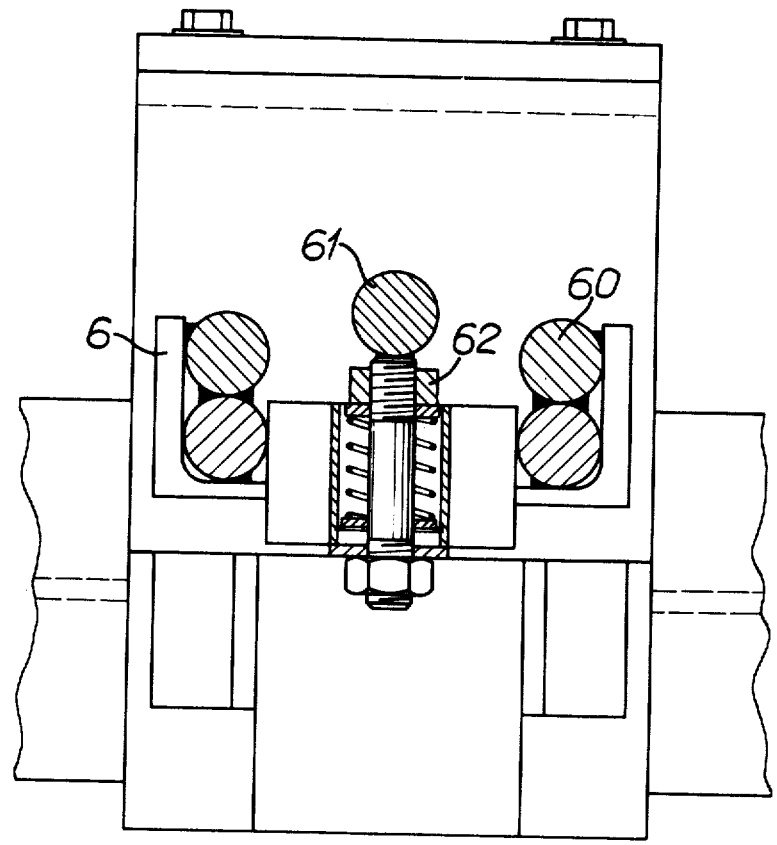
FIG. 4 is a cross-section of only the platform, taken along line IV—IV of FIG. 1.
Figure 5:
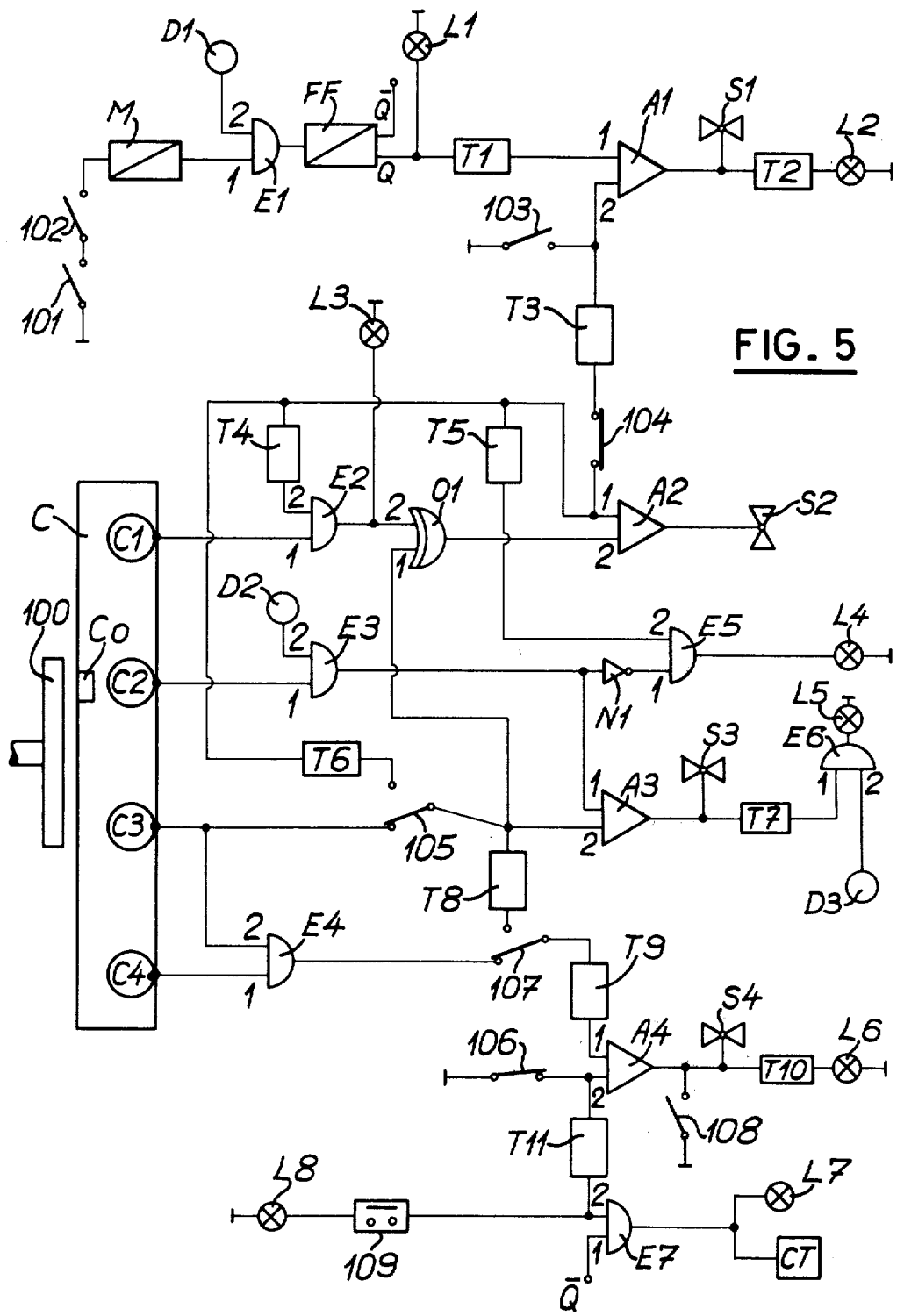
FIG. 5 is a diagram of the electronic control circuit of the device.

Reference is made to FIG. 4 which shows a detailed cross-section of the grids 6. Each grid 6 constituted by double irons 60 includes a central part 61, movable height-wise, and mounted on two spring-urged pistons 62 which enable actuation of a contact 101, 102 respectively, the purpose and operation of which will be specified further on (FIG. 5).

Driving of the entire device, movement of the hydraulic pistons, rotation of the rollers, control of the supply of water, is entirely automated by means of an electronic circuit located in a case 20 mounted in cabin 5.

Figure 6:
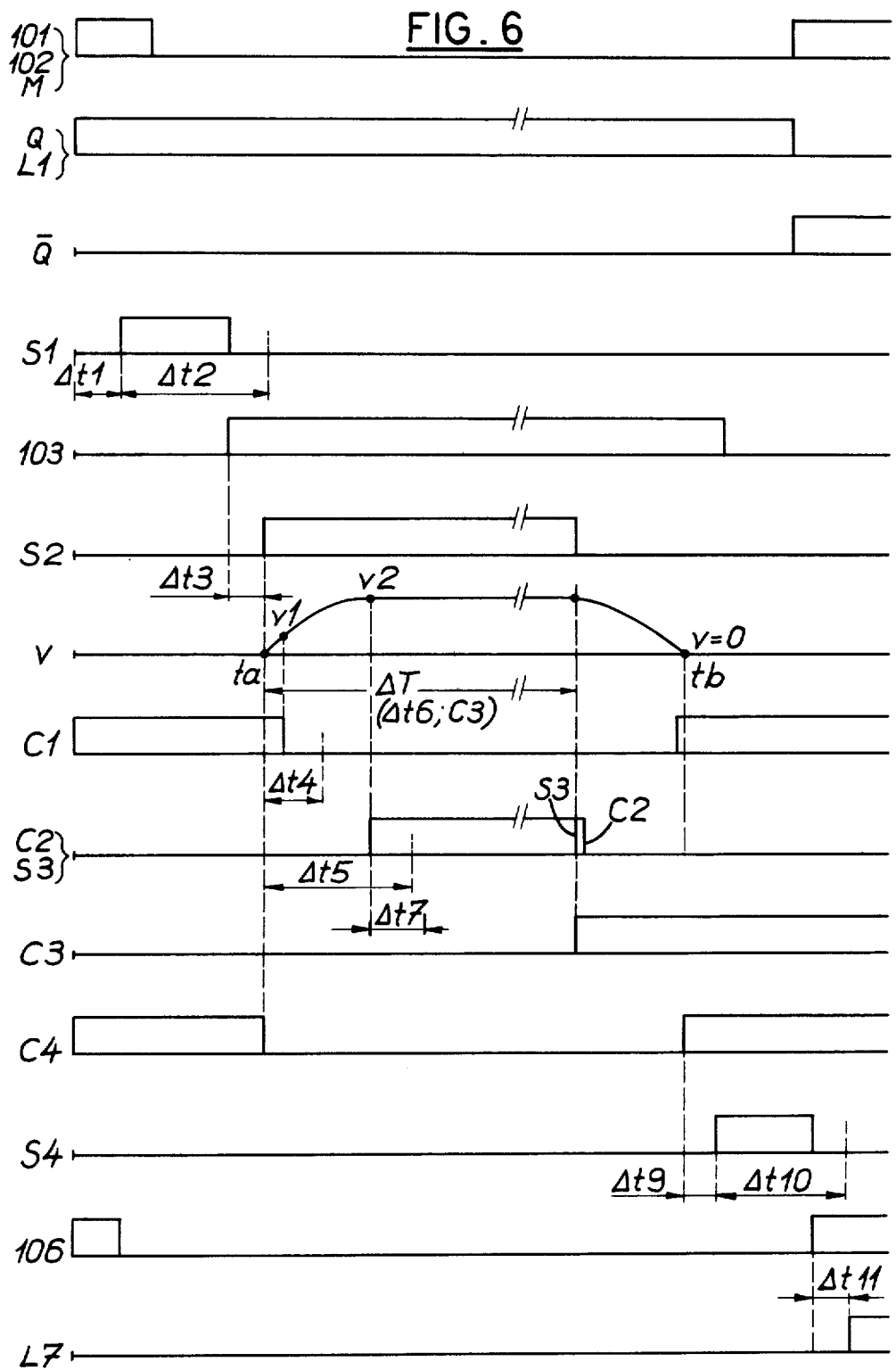
FIG. 6 is a phase diagram of this circuit.

This electronic circuit will now be described with reference to FIGS. 5 to 7. It comprises the following components:

Control members S1 and S4 for actuation of the electro-valve of pistons 7 of the grid. If member S1 is electrically energized, the valve is actuated so that grid 6 moves down; if member S4 is energized, the valve is actuated to raise the grid. This valve has for example two coils, one for lowering, the other for raising.

A control member S2 for actuating the electro-valve of the motors 11 for driving rollers 8. If member S2 is energized, the motors start up; if the member is de-energized, the motors stop. This member S2 includes for example a coil and a return-biasing spring.

A control member S3 for actuating opening the supply of water and air, and rotation of the brushes 14. Energization of this member enables starting up the water and air supply and rotation of the brushes, and de-energization thereof enables stopping.

Differential amplifiers A1, A2, A3, A4 each with two lead-ins 1, 2 and a single lead-out connected to the control member S1, S2, S3, S4 respectively. The amplifiers give an output signal as a function of the differences of the input potentials, as long as the potential at lead-in 1 is greater than that at lead-in 2. Thus, if an amplifier is energized by a potential at lead-in 1, can be cut off either by cutting off the potential at lead-in 1, or by applying at least the same potential at lead-in 2.

Time delay elements T1 to T11 by which an output signal is emitted after a time $\Delta t$ from the arrival of the input signal.

A counter C of the speed of the rollers, including a captor $C_o$ energized by a rotary disc 100 mounted at the end of shaft 9 of the rollers. The captor $C_o$ may be inductive, capacitive, photoelectric or mechanical and reacts when an exciting part of the disc passes in front of the captor. The counter C has four different output terminals C1, C2, C3 and C4. Terminal C1 gives a signal if the speed of rotation $v$ of the rollers is less than a given minimum speed $v1$, i.e. until a minimum speed $v1$ is reached, then there is no signal. A very low minimum speed $v1$ is chosen to enable control of the starting up of the rollers which could, for example, be held stationary by the wheels of the lorry remaining braked. Terminal C2 gives a signal when the normal operative speed of rotation of the rollers $v2$ has been reached or exceeded. In as much as the speed of rotation $v$ of the rollers is less than $v2$, there is no signal. The speed $v2$ is chosen in such a manner that the centrifugal effect is sufficient to eject mud from the wheels. Terminal C3 gives a signal after a predetermined number of revolutions of the rollers corresponding to a chosen number of kilometres of running (with the speed $v$ greater than or equal to $v2$) to ensure the centrifugal effect during a sufficient time for cleaning. Terminal C4 gives a "stop" signal if the speed of rotation $v$ of the rollers drops to zero, thus if the rollers after running become stationary.

Contacts 101, 102 on the grids 6. A contact 103 which may be a store contact (for example step-by-step, ferrite) for the end-of-path of the grids in the upper position. This contact 106 may open contact 103 at the end of the operation. A hand-operated contact 104 enabling the potential at the lead-in 1 of amplifier A2 to be momentarily cut and the delay elements T4, T5, T6 to be set to zero, and which may then be closed again. A contact 105 for selecting two operations, either with counter C3 or with delay element T6 during a given time $\Delta t6$. A contact 107 for manual actuation of amplifier A4 after passage of time $\Delta t8$. A manual contact 108 enabling raising of grid 6 in the event of an emergency. And a contact 109 for setting the entire device to zero after the end of an operation.

A detector D1 which enables detection of the stability of a lorry to be cleaned, i.e. whether it rests correctly on the grids with no undue vibrations or deformations. If everything is all right, detector D1 gives a signal.

A detector D2 of the degree of balance of fluid in the hydraulic circuits of the two grids 6. If there is balance, a signal is emitted.

A detector D3 for the spraying of water and/or air, and rotation of the brushes. A signal is given if the conditions are anormal, and the signal disappears if everything operates normally.

A lamp L1 giving a "ready" signal if the lorry is in the correct position and when the operations begins. A lamp L2 for warning if the grids 6 do not move down or only arrive in the lower position after a time greater than the normal lowering time $\Delta t2$. A lamp L3 for warning if the speed V1 is not reached after a given time $\Delta t4$. A lamp L4 for warning if the speed $v2$ is not reached after a given time $\Delta t5$, or if there is no balance. A lamp L5 for warning if there is no spraying of water and air or if the brushes 14 do not turn after a given time $\Delta t7$. A lamp L6 for warning if the grids do not move up or do not reach their upper position by a given time $\Delta t10$. A lamp L7 for signalling the end of operation; and a lamp L8 signalling if the device is ready for a new operation after the contact 109 has been actuated for setting to zero.

A counter CT which totals the number of operations.

These components are connected by logical elements as shown in FIG. 5, namely: AND elements E1 to E7, an OR element O1, a NO element (i.e. an invertor stage) N1, a monostable M for avoiding false signals in case of rebounding of contacts 101, 102, and a bistable (flip-flop) FF which alternately gives an output signal Q or $\overline{Q}$ when successive pulses arrive at its lead-in.

The automatic operation will now be described with reference to FIGS. 5 and 6. When contacts 101, 102 are closed by the weight of a lorry whose wheels rest on the grids 6 monostable M receives an input signal and consequently emits an output signal which will be transmitted by element E1 if the stabilization detector D1 gives a stabilization signal. The bistable FF is triggered and output signal Q appears. This output signal lights up lamp L1, which signifies that the operation may begin, and also gives an input signal to delay element T1 which, after a time $\Delta t1$, gives a signal to the lead-in 1 of amplifier A1 which triggers the control member S1 to actuate pistons 7 to lower grids 6.

At the output of amplifier A1 is connected the delay element T2 followed by warning lamp 12. The delay $\Delta t2$ is chosen slightly greater than the normal time required for lowering the grids. Hence, if after this time the grids have not reached the lower position, the lamp L2 gives a warning.

When the lower position of grids 6 is reached, the contacts 101, 102 are opened, as well as contact 106, and the output signal of monostable M disappears; the lower end-of-path contact 103 closes which results on the one hand in the provision of a signal at the lead-in 2 of amplifier A1 to cut the energization of S1 and on the other hand in the giving of a signal via delay element T3 and normally-closed contact 104 to the lead-in 1 of amplifier A2 whose output energizes control member S2 to start up rollers 8. The input signal which arrives at the lead-in 1 of amplifier A2 is simultaneously transmitted to three delay elements T4, T5 and T6 connected in parallel. The delay $\Delta t4$ is slightly greater than the normal time required for the rollers to reach a minimum speed $v1$ at which the signal from terminal C1 disappears (see the diagram C1 of FIG. 6).

We will firstly consider normal operation, in which the minimum speed $v1$ is reached before lapse of the time $\Delta t4$ and the normal working speed $v2$ of the rollers is reached in a period less than the time $\Delta t5$ given by delay element T5. In these conditions, in as much as the speed $v2$ is reached or exceeded, the terminal C2 of counter C gives a signal to the lead-in 1 of element E3 whose other lead-in 2 is connected to the detector D2 of the hydraulic balance of the hydraulic circuit. Thus, if, after this time $\Delta t5$ normal balancing is established, element E3 transmits an output signal to the NO element N1 which is connected to the lead-in 1 of element E5, i.e. there is no signal at the lead-in 1 of this element E5 and consequently no output signal of element E5. The output signal of element E3 is simultaneously delivered to the lead-in 1 of amplifier A3 to energize the control member S3 to start the supply of air and water for cleaning, and also to start up rotation of brushes 14. The lead-out of amplifier A3 is also connected via delay element T7 to the lead-in 1 of element E6 whose other lead-in 2 is connected to detector D3 which gives a signal only if the working pressure of the water and air, or the normal speed of the brushes, is not reached. If there is any trouble whatsoever with the air, water or rotation of the brushes after a time $\Delta t7$, the element E6 receives signals at its two lead-in 1, 2 and emits an output signal which actuates warning lamp L5. However, if everything operates normally, the lamp L5 does not light up.

The counter C is arranged so that after a given number of revolutions of the rollers which corresponds to running of the lorry over a given distance in kilometres, the terminal C3 gives an output signal which is transmitted on the one hand via the OR element O1 to the lead-in 2 of amplifier A2 to de-energize the control member S2 and thus stop drive of the rollers, and on the other hand to the lead-in 2 of amplifier A3 which results in cutting off of this amplifier A3. The member S3 is thus closed to stop rotation of the brushes and the supply of water and air. Rotation of the wheels is stopped and when the speed of the rollers drops to zero, terminal C4 gives a signal to the lead-in 1 of element E4 and, since the terminal C3 is still applied to the lead-in 2 of this element E4, a signal is given via contact 107 to delay element T9 which, after a safety time $\Delta t9$, energizes amplifier A4 which in turn energizes the control member S4 which actuates raising of the grids. When the grids reach the upper position, the end-of-path contact 106 closes, so that amplifier A4 and consequently member S4 are de-energized. Once more, as previously, the lead-out of amplifier A4 is connected via a delay element T10 to warning lamp L6, the delay $\Delta t10$ being chosen greater than the normal time for raising the grid, i.e. if the grid has not reached its upper position in normal time, a warning signal will be given.

Upon closing of contact 106 and after a time $\Delta t11$ determined by delay element T11, a signal is given to the lead-in 2 of element E7. Before the grids reach the upper position, the lorry's tyres close contacts 101 and 102; the monostable M1 is thus energized and sends an input signal to bistable FF which trips and causes removal of the output signal Q, whereas signal $\overline{Q}$ appears (see FIG. 6). This output signal $\overline{Q}$ is delivered to the lead-in 1 of element E7 and when there are signals at the lead-ins 1 and 2 of this element E7 it emits an output signal which lights lamp L7 to signal the end of operation, and simultaneously advances the counter CT of the total number of operations by one unit.

The zero-setting contact 109 may then be actuated to reset all of the elements to their initial states whereupon lamp L8 provides a "ready" signal which signifies that a new operation may begin.

In the circuit of FIG. 5, the selector 105 is shown connected to the terminal C3 as described, but there is an alternative operation in which the duration of rotation of the rollers is set by the delay element T6 at a time $\Delta t6$ after the starting up of the rollers, and chosen at will. It is thus the output of T6 which will determine the final steps of the described operation.

Hence, once normal operation such as described has been carried out, the vehicle's tyres will have been driven at a rotational speed equal to or greater than $v2$ during a predetermined time $\Delta t6$, or a predetermined number of kilometres given by preselection of C3.

If any trouble occurs whereby after switching on member S2, i.e. after starting up of the rollers, the minimum speed $v1$ (which may be chosen relatively low) is not attained during time $\Delta t4$, once this time $\Delta t4$ is up, element E2, which receives signals at its two lead-ins 1 and 2 since terminal C1 of the counter still gives a signal, emits an output signal which is transmitted via OR element O1 to the lead-in 2 of amplifier A2 to close this amplifier and thus stop energization of S2. Simultaneously, the warning lamp L3 connected to the lead-out of E2 lights up. The cause of this trouble must first be eliminated (for example, the brakes of the vehicle must be released) and once this trouble is eliminated, the operation can be continued by manually actuating contact 104 which results in cutting off the potential at lead-in 1 of amplifier A2 and simultaneously setting to zero the three delay elements T4, T5, T6. The contact 104, which may for example have a biasing spring to hold it closed in the normal position, is released and normal operation begins, i.e. there is once more a signal at the lead-in 1 of amplifier A2 which is energized and at the lead-ins of delay elements T4, T5, T6.

If after a time $\Delta t5$ determined by delay element T5 the normal working speed $v2$ has not been reached, the element E5 simultaneously receives signals at its two lead-ins 1, 2 (since element E3 has no output signal and thus, through NO element NI, there is provided a signal at the lead-in 1 of E5) and lamp L4 lights up.

To enable possible manual intervention during operation, the contact 107 is provided so that the lead-in 1 of amplifier A4 may be connected to terminal C3 via a delay element T8 which gives a slight delay $\Delta t8$. The urgency switch 108 enables raising of the grids 6 to the upper position to enable the lorry to move off in an emergency; when used, it directly places the control member S4 under potential.

Figure 7:
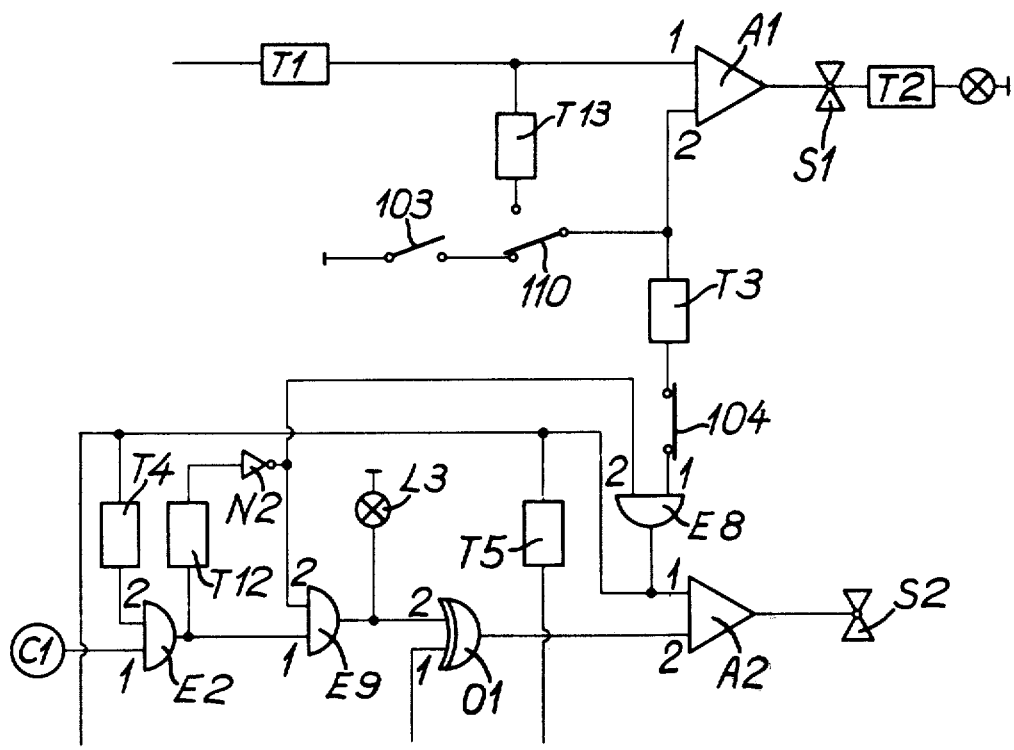
FIG. 7 shows a variation of a part of the circuit according to FIG. 5.

FIG. 7 shows part of a more elaborate circuit which takes into account the fact that it is quite probable that the lorry driver may inadvertently forget to release the brakes, and this circuit enables a manual intervention to be avoided in this case. FIG. 7 shows only the complementary part of the circuit, the other connections remaining the same as in FIG. 5.

Between the delay element T3 and amplifier A2 is provided an AND element E8 whose lead-in 2 normally receives a signal from a NO element N2; hence if after the first step of the operation element T3 gives an output signal, A2 will normally be energized, as already described, as well as the delay elements T4, T5 and T6 (not shown). As described later on, if after time $\Delta t4$ there is still an output at terminal C1, (i.e. the speed v1 has not been reached) the output signal of element E2 will be transmitted via another AND element E9 and OR element O1 to the lead-in 2 of amplifier A2 to de-energize the control member S2 and simultaneously give a warning by lamp L3, as already described. In this case, element E9 transmits the signal since its other lead-in 2 receives a signal from NO element N2. At the lead-out of E2 is provided a delay element T12 having a delay $\Delta t12$ for example approximately equal to 10 seconds, which time is in principle sufficient for a driver, after having become aware of the warning signal, to release the vehicle's brakes. After time $\Delta t12$ has passed, delay element T12 gives a signal which results in removal of the output signal emitted by element N2, hence simultaneously in removal of the output of element E9 and in consequence the signals at lead-in 2 of amplifier A2, lead-in 2 of element E8 and lead-in 1 of amplifier A2. Removal of the signal at lead-in 1 of amplifier A2 results not only in leaving the amplifier A2 shut off, but in setting to zero the delay elements T4, T5 and T6. At the moment when the output signal of T4 is disappears the output signal of E2 vanishes which sets to zero the delay element T12 and thus causes element N2 to once more give an output signal. Hence, the initial state is re-established, namely that element E8 gives a new signal to the lead-in 1 of amplifier A2 to energize member S2 and the sequence of operations recommences. Moreover, this sequence could be repeated several times if the cause of the trouble is not eliminated in the time $\Delta t12$. However, in principle, in most cases, the trouble is caused by an omission to release the vehicle's brakes and this can easily be put right and the remainder of the operation can then continue automatically without manual intervention.

If the cause of the trouble is unknown, automation of the operation can be interrupted by opening the hand switch 104 which cuts the potential energizing amplifier A2 and advantageously simultaneously closes the urgency switch 108 to raise the grid. For this purpose contacts 104 and 108 may be mechanically connected in such a manner that when contact 104 is opened contact 108 is closed.

In the circuit of FIG. 7, there is provided a possibility of manually intervening by means of a contact 110 to place the lead-in 2 of amplifier A1 under potential after a slight delay $\Delta t13$ provided by delay element T13 without closing the contact 103. Such manual intervention is for example advantageous to control operation of the device without a load. Analogous hand contacts may be provided for the other amplifiers A2, A3, A4.

The present invention is not limited to the described embodiments but variations may be made to the electronic circuit and the mechanical parts without departing from the scope of the invention.

It is for example possible to provide two amplifiers A2 and two control members S2 mounted in parallel to separately control the two hydraulic circuits of the rollers.

It is also possible to provide several control members S3 connected in parallel to separately control the supply of water, air and the rotation of brushes 14.

In the described embodiment, all of the possible warning signals are preferably united in a central panel which also includes the other lamps, the hand contacts and the selector 105 as well as the selection buttons of the terminals C1, C2, C3 of counter C and delay element T6.

What is claimed is:

1. A device for cleaning the wheels of vehicles, comprising a frame, a platform, two pairs of rollers which may be rotated by at least one motor and are disposed in a manner to turn a set of coaxial wheels of a vehicle to be cleaned, one of the two parts namely the platform or roller bearings being movable heightwise by the intermediary of hydraulic cylinders between a first position in which said wheels are supported by the platform and a second position in which said wheels are supported by the rollers, and means for cleaning said wheels, characterized in that it further comprises:
   a. at least one contact on the platform for actuation by the vehicle in its correct position, and connected in a first circuit controlling a first control member which triggers movement of the said mobile part towards its second position;
   b. at least one end-of-path contact actuated by said mobile part in its second position and connected in a second circuit controlling a second control member for starting up the rollers;
   c. a counter of the rotation speed of the rollers adapted to emit signals; and
   d. an electronic circuit controlled by said second circuit and by the signals of said counter and including: a third circuit energizing an alarm with a delay ($\Delta t4$) defined by a delay element (T4) if after actuation of said second control member the rollers do not reach a given rotational speed; a fourth circuit controlling a third control member for staring up said cleaning means; a fifth circuit for providing after a given period a stop signal which stops the rollers and said cleaning means; and a sixth circuit controlling a fourth control member to actuate the movement of said mobile part towards its first position.

2. A device according to claim 1, in which the control input of said fifth circuit is connected to an output terminal (C3) of the counter giving a signal after a selected number of revolutions of the rollers is reached.

3. A device according to claim 2, in which said fifth circuit comprises a selector (105) which may be connected either to said terminal (C3) of the counter or to the lead-out of a delay element (T6) whose lead-in is connected to said second circuit.

4. A device according to claim 1, in which said counter has at least three different output terminals, a first terminal (C1) giving a signal after a minimum speed of the rollers is reached, said first terminal being connected to the third circuit which is connected to the second control member to stop the rollers in the event of an alarm; a second terminal (C2) giving a signal when a given speed of operation is reached, said second terminal being connected to the fourth circuit; and a third terminal (C3) which gives a signal after a selected number of revolutions of the rollers is reached.

5. A device according to the claim 4, in which the third circuit comprises a futher delay element (T12) providing, with a delay ($\Delta t12$) greater than the delay ($\Delta t4$) of the first delay element (T4), an output signal to set to zero said delay elements (T4 and T12) and re-trigger said second control member.

6. A device according to claim 4, in which the counter has a fourth output terminal (C4) connected to the sixth circuit and which emits a signal when the rollers stop to trigger the fourth control member.

7. A device according to claim 1, comprising an end-of-path contact (106) actuated by said mobile member in its first position to signal the end of the operation.

8. A device according to claim 1, comprising warning devices (L2, L3, L4, L5, L6) for each operational sequence adapted to be energized after a delay time slightly greater than the normal time of the respective operational sequence and defined by a delay element (T2, T4, T5, T7, T10).

9. A device according to claim 1, comprising delay elements (T1, T3, T9, T11) providing delay periods between at least several operational sequences.

10. A device according to claim 1, in which said control members are supplied by the intermediary of differential amplifiers.

11. A device according to claim 1, comprising a stabilization detector (D1) detecting the exact and stable position of the vehicle on the platform.

12. A device according to claim 1, comprising at least one hydraulic motor for driving the rollers, and a detector (D2) of the balancing of the hydraulic circuits for the rollers.

13. A device according to claim 1, comprising hand switches (104, 107, 108, 110) for manually controlling at least one sequence of the operation.

14. A device according to claim 1, in which the platform is a grid which forms the mobile member.

15. A device according to claim 14, in which the grid includes an intermediate bar which may be pressed by the weight of the vehicle against the action of a return spring and which actuates said contact (101, 102).

16. A device according to claim 1, in which the cleaning means includes rotary brushes mounted on levers articulated to said mobile part so that the brushes tip into an operative position when said mobile part moves into its second position, and into a rest position when said mobile part moves into its first position.

17. A device according to claim 1, in which the cleaning means includes rotary brushes on one side of the rollers and fluid-supply nozzles on the other side of the rollers.

* * * * *